United States Patent
Halsted et al.

(10) Patent No.: US 6,470,273 B2
(45) Date of Patent: Oct. 22, 2002

(54) COLLISION WARNING SYSTEM

(76) Inventors: Milton Halsted, 27203 Paseo Lomita, San Juan Capistrano, CA (US) 92675; Harvey Williamson, P.O. Box 423, Cabazon, CA (US) 92236

(*) Notice: Subject to any disclaimer, the term of this patent is extended or adjusted under 35 U.S.C. 154(b) by 0 days.

(21) Appl. No.: 10/033,633

(22) Filed: Dec. 26, 2001

(65) Prior Publication Data

US 2002/0082777 A1 Jun. 27, 2002

Related U.S. Application Data

(63) Continuation-in-part of application No. 09/709,058, filed on Nov. 8, 2000, now abandoned.

(51) Int. Cl.$^7$ ................................................. G08G 1/16
(52) U.S. Cl. ................ 701/301; 701/300; 701/214; 180/167; 180/169; 342/455; 348/113; 340/435; 340/436
(58) Field of Search ........................... 701/300, 301, 701/214; 180/167, 169; 342/455; 348/113, 148; 340/436, 435, 903; 356/498, 394

(56) References Cited

U.S. PATENT DOCUMENTS

| | | | | |
|---|---|---|---|---|
| 3,192,437 A | 6/1965 | Meyer | ............... | 315/77 |
| 3,935,922 A | 2/1976 | Cooper et al. | ............... | 180/168 |
| 4,872,051 A | * 10/1989 | Dye | ............... | 348/113 |
| 5,214,408 A | 5/1993 | Asayama | ............... | 340/435 |
| D366,848 S | 2/1996 | Brown et al. | ............... | D10/104 |
| 5,568,137 A | * 10/1996 | Liu | ............... | 340/905 |
| 5,668,539 A | 9/1997 | Patchell | ............... | 340/903 |
| 5,805,103 A | 9/1998 | Doi et al. | ............... | 342/70 |
| 5,890,083 A | 3/1999 | Franke et al. | ............... | 701/45 |
| 5,920,382 A | 7/1999 | Shimizu et al. | ............... | 356/498 |
| 5,963,127 A | 10/1999 | Lang et al. | ............... | 340/436 |
| 5,982,278 A | 11/1999 | Cuvelier | ............... | 342/436 |
| 6,044,632 A | 4/2000 | Schmalz et al. | ............... | 56/10.2 R |
| 6,225,918 B1 | * 5/2001 | Kam | ............... | 340/903 |

FOREIGN PATENT DOCUMENTS

EP  0918232 A2  5/1999

* cited by examiner

*Primary Examiner*—William A. Cuchlinski, Jr.
*Assistant Examiner*—Marthe Marc-Coleman
(74) *Attorney, Agent, or Firm*—Gene Scott-Patent Law & Venture Group

(57) ABSTRACT

A collision warning system includes pairs of optical sensors integral to a moving vehicle. Each of the optical sensors of the pairs of said sensors is enabled for the detection of visible light magnitudes and infrared light magnitudes in the external vicinity of the vehicle, and for creating corresponding electrical signals. Temporal changes in the magnitudes of the electrical signals and a probability of a collision with an object external to the vehicle, are determined and a warning signal is generated when collision is possible. Warning information is presented to alert a vehicle operator as to the possible collision. A reference sensor and an object sensor, are enabled for generating the related electrical signals. The reference and object sensors are positioned in such proximity as to determine when a collision object has entered a sensing field of view.

21 Claims, 2 Drawing Sheets

COLLISION WARNING SYSTEM

This application is a continuation in part of co-pending U.S. application Ser. No. 09/709,058 filed on Nov. 8, 2000, now abandoned.

BACKGROUND OF THE INVENTION

1. Field of the Invention

This invention relates generally to systems for collision avoidance in traffic by automotive vehicles and more particularly to an apparatus for avoiding collision by sensing the presence of nearby vehicles and alerting a driver.

2. Description of Related Art

The following art defines the present state of this field:

Brown et al., U.S. Pat. No. D366,848 describes the ornamental design for a vehicle proximity warning indicator.

Meyer, U.S. Pat. No. 3,192,437 describes a vehicle having a rearwardly directed lamp and a voltage source, a warning system for indicating to the operator of a succeeding vehicle that he is too close for driving safety and comprising an electromagnetic relay including an armature, a switch having a movable contact and first and second stationary contacts, said movable contact being actuable by said armature circuit means connecting the movable contact with the source, circuit means including a flasher unit connecting the first stationary contact with the lamp, circuit means connecting the second stationary contact with the lamp and light responsive means on said vehicle and positioned to receive light from the headlights of a succeeding vehicle, said light responsive means connected with the source for developing a signal quantity corresponding to the intensity of light received from the headlamps of a succeeding vehicle, the relay actuated switch including a relay coil connected with the light responsive means for energization thereby and for actuating the movable contact so as to selectively connect the movable contact with the first and second stationary contacts to respectively alternately or constantly energize the lamp when the intensity of light received from a succeeding vehicle is respectively above or below a predetermined value.

Cooper et al., U.S. Pat. No. 3,935,922 describes a vehicle guidance mechanism for guiding a vehicle along a surface by means of an invisible guide line containing fluorescent material comprising an ultraviolet lamp that causes the guide line to fluoresce and emit visible light; photocell sensors mounted in the vehicle and adapted to sense the visible radiation and produce an error output signal proportional to the variation of vehicle position from a predetermined lateral position with respect to the guide line; and a control device in the vehicle adapted to steer the vehicle in response to the error signal so as to cause the vehicle to follow the guide line. An automatic contrast control circuit eliminates the effect of background illumination in the output signal and produces a constant closed loop gain with respect to the signal received from the guide line. Modulation circuitry and appropriate filters further reduce the effects of background illumination and improve the reliability and line detecting ability of the guide system. Line detection circuitry is employed to prevent operation of the automatic control device unless the vehicle is tracking a valid guide line/

Asayama, U.S. Pat. No. 5,214,408 describes a distance detecting apparatus enabling the driver of a vehicle to readily and concurrently recognize the location and direction of each of a plurality of objects present in the driver's field of view, in daylight or darkness, and at the same time determine whether each of the objects is an obstacle to the vehicle travel. The objects sensed by a pair of first and second image sensors 3, 4 are displayed on a screen 11 in a plurality of windows 15–19. Deviations between the images of the objects within the respective windows are electrically detected so that the distance to an object within each window is individually calculated based on the deviations. Obstacles to the travel of the vehicle can be discriminated on the basis of the positions of the windows on the screen and the distances to the objects in the respective windows as detected. Infrared light can be projected onto objects present within the fields of view of the image sensors when natural visible light is insufficient for the image sensors which, in this case, are sensitive to infrared light.

Patchell, U.S. Pat. No. 5,668,539 describes a thermal emitted radiation detecting device configured to detect objects in visual blind spots of a vehicle. A low cost differential detector is used which is sensitive to temperature change. Optics train two different fields of view on the detector and switch between the two fields of view to provide a blind spot field of view and a reference field of view. The presence of a vehicle in the blind spot field of view results in a temperature difference between the two fields of view. The resulting detector output signal is compared to predetermined threshold levels and then used to provide an indication, either visual or audible. Several embodiments of optics and switching fields of view are provided.

Doi et al., U.S. Pat. No. 5,805,103 describes a distance monitoring system of a vehicle monitoring a distance to a preceding vehicle traveling directly ahead of the vehicle to determines whether the preceding vehicle is decelerating by comparing a change in the vehicle speed with a reference value which is varied according to various driving condition in relation in particular to dangers such as collisions against the preceding vehicle.

Franke et al., U.S. Pat. No. 5,890,083 describes an apparatus for determining the distance of a vehicle from a roadway side marking. An arrangement of light sensitive sensor elements is fitted to the vehicle for optically scanning a portion of the roadway located in front of the vehicle. An evaluation unit, connected downstream of the sensor element arrangement, is also provided. Only one or a few sensor element lines are used as the sensor element arrangement. Each line scans a narrow strip of the roadway which runs in front of the vehicle, not parallel to the vehicle longitudinal axis, and extends laterally as far as the roadway side marking. The evaluation unit reads each sensor element line sequentially and processes the received signals to determine the lateral distance of the vehicle from the roadway marking. The relatively small quantity of data which accumulates permits the processing of the data digitally in real time by a conventional microprocessor. The apparatus is used as sleep warning system or lane guard for motor vehicles.

Shimizu et al., U.S. Pat. No. 5,920,382 describes a distance-measuring apparatus including light-sensitive devices formed of optical sensor arrays disposed on image-forming surfaces of right and left image-forming lenses, respectively. The apparatus uses image data from the optical sensor arrays of the light-sensitive devices to determine the distance from an object such as a vehicle in front of the apparatus via a distance detection circuit and capable of detecting condensation or a foreign particle obscuring a cover glass or defective pixels in the optical sensor arrays. In a defective condition, a defective visibility sensor emits an alarm signal to alert the operator.

Lang et al., U.S. Pat. No. 5,963,127 describes a control device for vehicles including a sensor mounted to the vehicle for detecting an object in a monitored zone adjacent the vehicle and providing a responsive output signal when an object is detected in the monitored zone; a signaling device mounted to the vehicle for providing a speed output signal indicative of a speed of travel of the vehicle; a control unit mounted to the vehicle for receiving sensor output signals and speed output signals; and a warning device mounted to the vehicle for providing a warning signal to a driver of the vehicle, the control unit controlling the warning device to provide the warning signal responsive to the sensor output signal and the speed output signal so that the warning device provides a warning signal only when the sensor detects an object in the monitored zone and the signaling device provides a speed output signal indicating that the speed of the vehicle is below a predetermined value. A related vehicle and method are also disclosed.

Cuvelier, U.S. Pat. No. 5,982,278 describes a device for improving vehicle driving safety and comfort. The main road sign information encountered during a journey is transmitted to the vehicle, the position of the vehicle on the driving surface is continuously monitored, and the road surface is checked for the presence of foreign matter such as mud, snow, ice, etc. A set of transmitting-receiving sensors suitably arranged on the vehicle and facing the driving surface continuously observes changes in the reflective properties of the observed areas within the sensitivity range thereof. Markings defining lanes and shoulders lied with grassy, gravelly or sandy areas are sensed by the sensors as soon as the vehicle approaches or drives over them. The signals from the sensors are processed by an electronic unit controlling an on-board signalling system linked to an alarm system for warning the driver of road hazards and possible unsafe driving (straying off-course, speeding, etc.). By reacting instantly, the driver thus informed can avoid a potential accident.

Schmalz et al., U.S. Pat. No. 6,044,632 describes a backup proximity sensor for a vehicle including a first passive infrared sensor (PIR) and a second PIR vertically mounted with respect to one another on a pivotal support member. The first PIR and second PIR are angularly directed such that the respective fields of view converge, establishing a detection zone in a region behind a vehicle. A drive motor and scanning gear box are coupled to the pivotal support member and pivotally drive the first and second PIR in an oscillatory fashion about a predetermined arc. This establishes relative motion between the PIRs and a stationary warm body in the field of view of the two sensors, allowing the stationary body to be detected. A detection circuit receives output signals from the first PIR and second PIR and generates an output signal indicative of a warm body being detected by both the first and second PIRs. This eliminates false alarms generated by warm bodies outside the region of the desired detection zone.

Kato et al., EP 0918232 describes distance sensors are mounted on both ends of a vehicle and have light transmitting and receiving sections. A distance to an object is independently measured by alternately transmitting "one-side-only enlarged light beams" at a time interval and receiving corresponding reflected beams from the object. In an overlapped area of the "one-side-only enlarged light beams," the distance from the vehicle to the object, as well as the azimuth of the object, is measured by a triangulation distance measurement using an interval between the distance sensors as a baseline. The lengths of the "one-side-only enlarged light beams" in the running direction of the vehicle are about 50 m and a width vertical to the running direction of the overlapped area is about 2 m slightly greater than a width of the vehicle.

The prior art teaches the use of thermal radiation sensing in visual blind spots, of determining through sensors when a preceding vehicle is changing its rate of speed, of determining when a vehicle is in a blind spot, of observing the reflective properties of a road surface to detect when a vehicle has strayed off-lane, of sensing an invisible guide line in the road for vehicle control, of determining the distance of a vehicle from a roadway side barrier, of vehicle following distance determination, and of warning alert devices. However, the prior art does not teach the present system of energy detection and use for warning of potential collision. The present invention fulfills these needs and provides further related advantages as described in the following summary.

SUMMARY OF THE INVENTION

The present invention teaches certain benefits in construction and use which give rise to the objectives described below.

A collision warning system of the invention is highly reliable in all weather and environmental conditions. It incorporates broad band optical sensors to analyze the light and heat signatures occurring in a roadway environment as a vehicle passes through it and comes into proximity of other vehicles, roadway barriers, overpasses, pedestrians and other common highway elements. Pairs of optical sensors are integral to a moving vehicle. Each of the optical sensors is enabled for the detection of visible light magnitudes and infrared light magnitudes in the external vicinity of the vehicle, and for creating corresponding electrical signals. Temporal changes in the magnitudes of the electrical signals and a probability of a collision with an object external to the vehicle, are determined and a warning signal is generated when collision is possible. Warning information is presented to alert a vehicle operator as to a possible collision. A reference sensor and an object sensor, are enabled for generating the related electrical signals. The reference and object sensors are positioned in such proximity as to determine when a collision object has entered a sensing field of view.

A primary objective of the present invention is to provide an apparatus and method of use of such apparatus that provides advantages not taught by the prior art.

Another objective is to provide such an invention capable of detecting a potential collision situation so that an operator may be able to avoid it.

A further objective is to provide such an invention capable of detecting both visible and infrared light.

A still further objective is to provide such an invention capable of detecting both a reference signal and an object signal and determining through the temporal events sensed in both of the fields, when a collision is likely.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention, an apparatus for detecting a possible collision between a vehicle and another object and for avoiding such through the use of an alert device.

Figure 1:
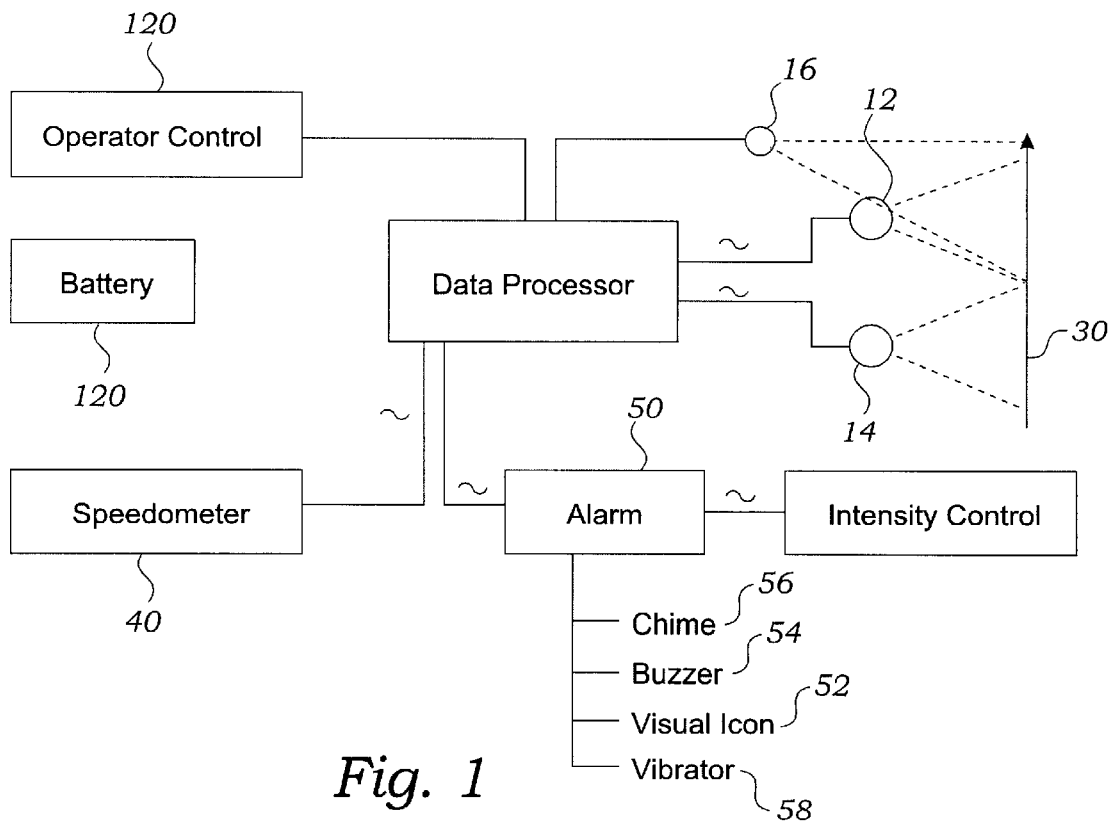
FIG. 1 is a block diagram of the preferred embodiment of the invention.
Figure 2:
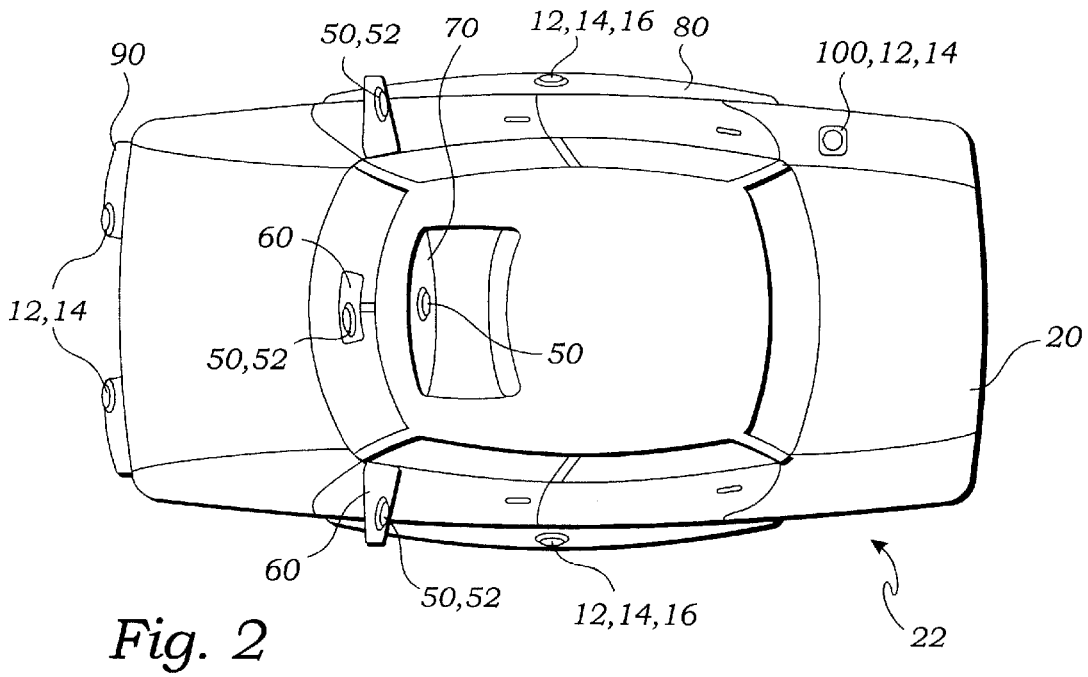
FIG. 2 is a mechanical schematic layout thereof.

The apparatus, which will be referred to herein alternately as "the system," comprises an electo-optical system, see FIGS. 1 and 2, including a data processor 5 and an electrical circuit comprising plural pairs of optical sensors 12, 14 integral to a moving or stationary vehicle 20, where each of the optical sensors 12, 14 is enabled with a lens system for the detection of visible light magnitudes and infrared light magnitudes and for the creation of corresponding electrical signals which are then processed by the electrical circuit. The data processor 5 receives the electrical signals and is programmed as a means for comparing the electrical signals. The data processor 5 is also a means for generating an alarm signal under certain conditions, as will be described. A warning information presentation means or "alarm" 50 is enabled for receiving the alarm signal so as to alert a vehicle operator as to a possible danger. Each of the plural pairs of optical sensors 12, 14 comprise at least one reference sensor 12 and at least one object sensor 14. Each of these sensors is enabled, as would be possible by those of skill in the art, for generating the visible light magnitude related electrical signal and the infrared light magnitude related electrical signal, and these signals are preferably digital data in form. The reference and object sensors 12, 14 are directed in a physically spaced apart manner along the line of travel 30 of the vehicle 20, with the reference sensor 12 preceding the object sensor 14. Initially, therefore, both the reference sensor 12 and the object sensor 14 receive light from the empty roadway and the system is able to self calibrate for signal differences between these two sensors due to focal length differences, given that both see the same surface but at different distances and field of view. Now, as the vehicle moves along its line of travel 30, the reference sensor 12 receives changes in the magnitude of light reflected up to it from the roadway prior to the object sensor 14. Since the electrical circuit receives information about the rate of travel of the vehicle from its speedometer circuit 40, the system knows, at each instant, the time necessary for the object sensor 14 to experience a change in roadway light reflection that is first experienced by the reference sensor 12. When a second vehicle approaches from the rear, due to its greater rate of travel, the object sensor 14 experiences a change in light reception prior to the object sensor 12. The system knows that the change in light reception at the object sensor 14 cannot be from the roadway because of the relationship between the two sensors 12, 14. When such a change occurs the system provides a warning (alarm) signal as it is likely that the second vehicle is nearby.

The use of visible and infrared (IR) light signals enables certain intelligence gathering by the system. For example, when for both sensors 12, 14, the IR signal changes at a greater rate than does the visible signal, it is a sign that the roadway temperature is, or has changed. When the visible signal changes more rapidly than does the IR signal it is a sign that the system is receiving a change in reflected light, such as during sun rise and sunset. The IR signal produces a heat signature proportional to the size of the approaching vehicle and this is able to be used even at night to determine the general type of approaching vehicles or other objects, i.e., trucks, cars, motorcycles, bicycles and pedestrians.

Figure 3:
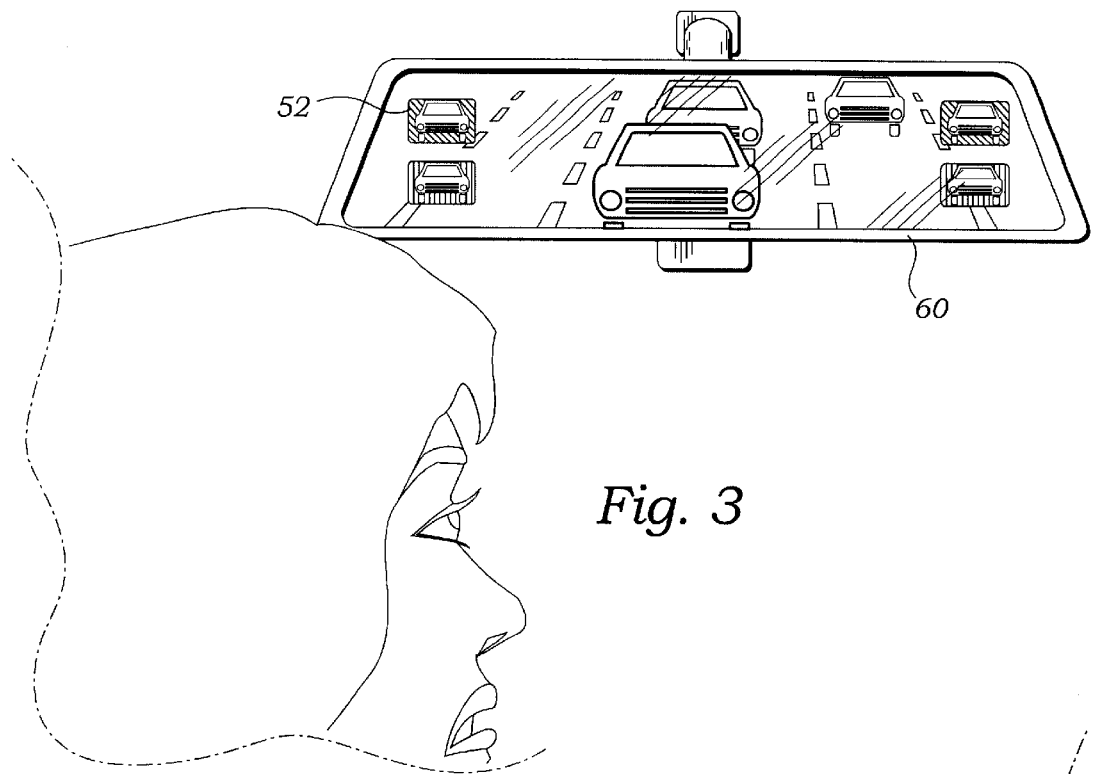
FIG. 3 is a perspective view of an inside rear view mirror thereof.
Figure 4:
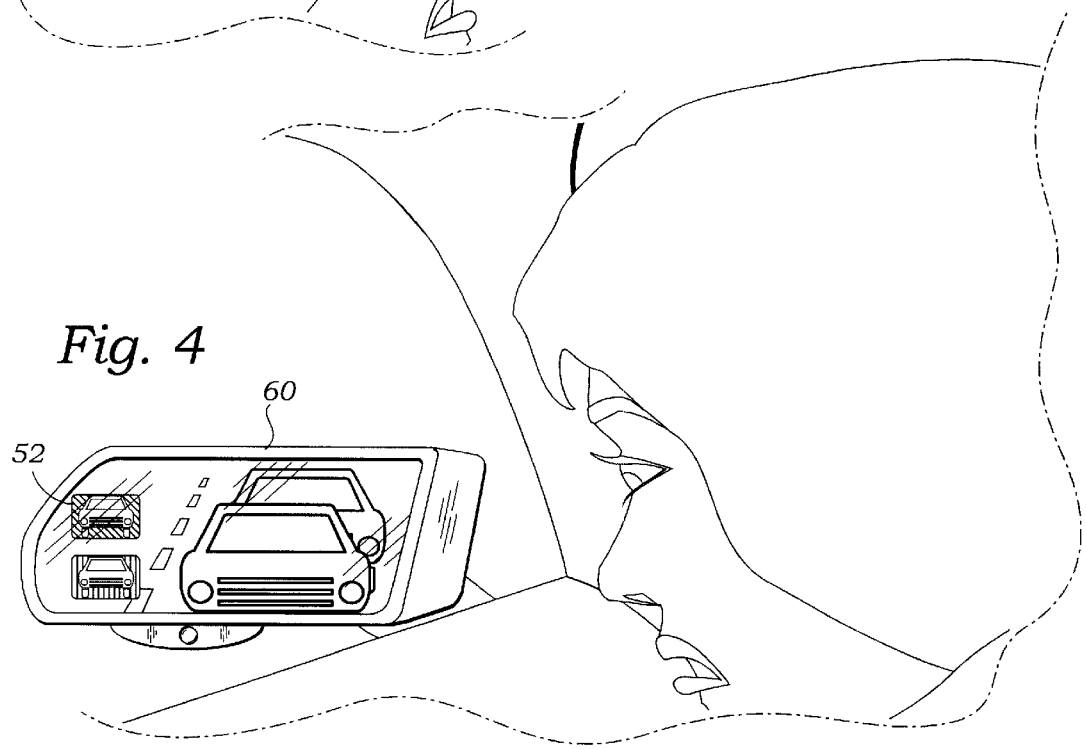
FIG. 4 is perspective view of an outside rear view side mirror thereof.

The warning signal presentation means 50 is preferably a lamp circuit within the visual field of the vehicle operator, where the lamp circuit is adapted for indicating changes, through a visual effect such as the icon 52 as is shown in FIG. 4, an outside rear view mirror 60. Preferably, the warning information presentation means 50 is mounted within the vehicle 20 and preferably in an interior rear view mirror 60 for displaying the icon 52 as is shown in FIG. 3. Alternately, it may be mounted in a dashboard 70 or otherwise. Alternately, the warning information presentation may be an audible alarm such as an electric buzzer 52 or a chime 54, a visible alarm such as a lamp or light or the icon 52, or a vibratory alarm such as a vibration device 58 mounted integrally with a restraint system (not shown) so as to be in contact with the body of the vehicle operator.

The plural pairs of optical sensors 12, 14 are preferably mounted, by standard mounted approaches, such as by common fasteners, on the exterior 22 of the vehicle 20 and are preferably positioned at, and directed away from, the front, sides and/or rear of the vehicle so as to detect impending dangers arriving from those directions. Such mountings may be integral to a trim component 80 of the vehicle 20 such as in a side bumper strip, a mirror component 60 of the vehicle, such as in the driver side rear view mirror of FIG. 4, a lamp component 90 of the vehicle, such as inside a lamp enclosure, or may be integral to an independent housing 100 mounted on the vehicle's surface or within the surface.

The electrical signals may be transmitted by signal conducting wires or by means of wireless communication, both of which may be implemented by well known technology to those of skill in the art, and the apparatus may be powered directly from the vehicle's electrical system or by an electrical source independent of the electrical system of the vehicle, such as a small battery 110, via circuits known by those of skill. The apparatus preferably provides alarm output intensity control 120 and other operator control of the apparatus through standard and well known circuits.

The apparatus preferably further comprises a heat sensor 16 mounted and positioned for detecting a heat signature in a position adjacent to the moving vehicle and in the space viewed by the optical sensor 12. Heat sensor 16 is of a common type specifically useful for sensing the heat given off by a vehicle moving on the road. It's purpose is to provide backup to the optical sensor 12 so that detection of an adjacent vehicle is further assured even when illumination is low or highly variable. It is noted that in FIG. 1, sensor 16 is adapted for viewing essentially the same viewing zone as sensor 12. This is depicted by the dashed lines. Sensor 16 may be mounted on one, or both sides of the vehicle.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus for collision warning in a vehicle, the apparatus comprising:

plural optical sensors integral to a moving vehicle, each of the optical sensors enabled and positioned for the detection of visible light magnitudes and infrared light magnitudes and for the creation of corresponding electrical signals, the sensors mounted such that light is received thereby from at least two points, one preceding the other along a line of travel of the vehicle;

a means for discriminating between roadway light reflection changes, and non-roadway light reflection changes and a means for comparing the electrical signals and for generating an alert electrical signal;

a warning alert presentation means enabled for receiving the alert electrical signal and to alert a vehicle operator as to a possible collision.

2. The apparatus of claim 1 wherein the optical sensors comprise at least one reference sensor and at least one object sensor, each of said sensors enabled for generating a visible light magnitude related electrical signal and an infrared light magnitude related electrical signal, the reference and object sensors positioned in such proximity as to determine when a collision object has entered the sensing field of the sensors.

3. The apparatus of claim 1 wherein the means for warning information presentation is a lamp circuit within the visual field of the vehicle operator, the lamp circuit adapted for indicating the advisability of a vehicle action through a visual effect.

4. The apparatus of claim 3 wherein the warning information presentation means is mounted within the vehicle.

5. The apparatus of claim 4 wherein the warning information presentation means is mounted in a rear view mirror.

6. The apparatus of claim 4 wherein the warning information presentation means is mounted in a dashboard.

7. The apparatus of claim 1 wherein the warning information presentation is an audible alarm.

8. The apparatus of claim 1 wherein the warning information presentation is a visible alarm.

9. The apparatus of claim 1 wherein the warning information presentation is a vibratory alarm.

10. The apparatus of claim 1 wherein the plural pairs of optical sensors are positioned on the exterior of the vehicle.

11. The apparatus of claim 10 wherein at least one of the plural pairs of optical sensors is integral to a trim component of the vehicle.

12. The apparatus of claim 10 wherein at least one of the plural pairs of optical sensors is integral to a mirror component of the vehicle.

13. The apparatus of claim 10 wherein at least one of the plural pairs of optical sensors is integral to a lamp component of the vehicle.

14. The apparatus of claim 10 wherein at least one of the plural pairs of optical sensors is integral to an independent housing on the vehicle.

15. The apparatus of claim 1 wherein the electrical signals are transmitted by signal conducting wires.

16. The apparatus of claim 1 wherein the electrical signals are transmitted by a means of wireless communication.

17. The apparatus of claim 1 wherein the apparatus is enabled for being powered by an electrical system of the vehicle.

18. The apparatus of claim 1 wherein the apparatus is enabled for being powered by an electrical source independent of the electrical system of the vehicle.

19. The apparatus of claim 1 further comprising a means for alarm output intensity control.

20. The apparatus of claim 1 further comprising a means for operator control of the apparatus.

21. The apparatus of claim 1 further comprising a heat sensor mounted and positioned for detecting a heat signature in a position adjacent to the moving vehicle.

\* \* \* \* \*